Jan. 17, 1939.　　　K. W. HALLDEN　　　2,144,308
FLYING CUTTING DEVICE
Filed June 29, 1936　　　4 Sheets-Sheet 1

Inventor,
Karl William Hallden,
By Louis M. Schmidt,
Atty.

Jan. 17, 1939.　　　K. W. HALLDEN　　　2,144,308
FLYING CUTTING DEVICE
Filed June 29, 1936　　　4 Sheets-Sheet 2

Inventor,
Karl William Hallden,
By Louis M. Schmidt
Atty.

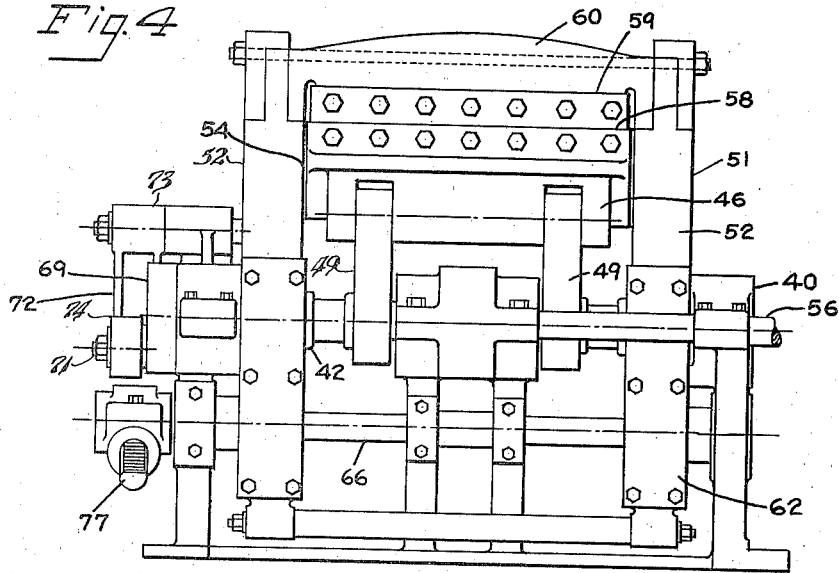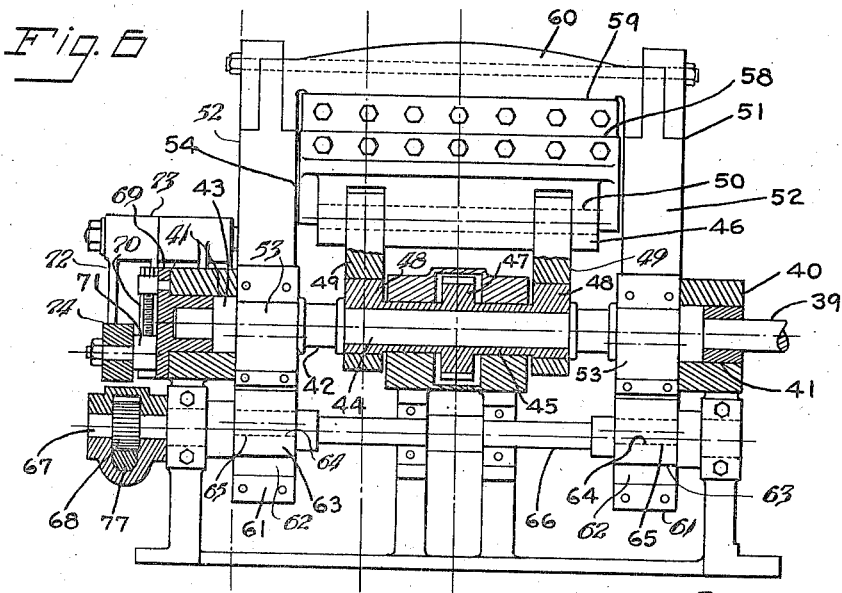

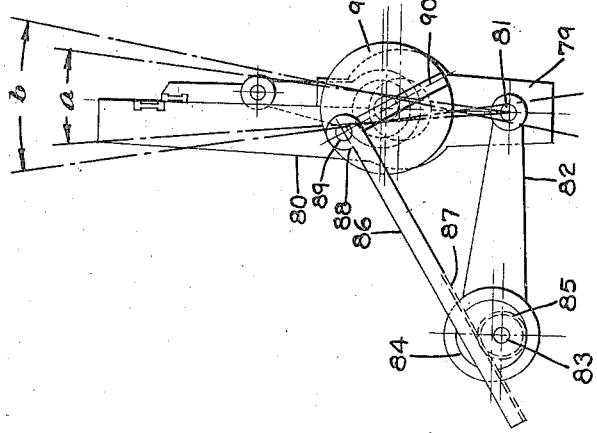
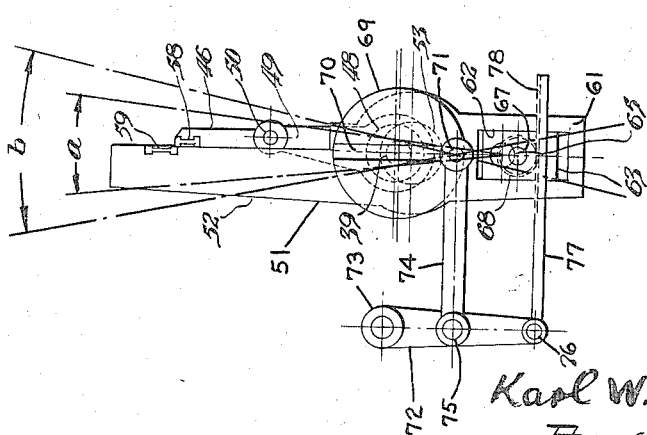

Patented Jan. 17, 1939

2,144,308

UNITED STATES PATENT OFFICE 2,144,308

FLYING CUTTING DEVICE

Karl William Hallden, Thomaston, Conn.

Application June 29, 1936, Serial No. 87,967

16 Claims. (Cl. 164—49)

My invention relates to improvements in flying cutting devices, of the form in which stock or material, as for instance, in the form of sheet metal, is cut while being fed to the machine continuously, and an object of my improvement is to produce a flying cutting device which is adapted to provide improved means of adjustment covering a relatively great variation in intervals between the cutting actions and in conjunction therewith provides a proper corresponding range for synchronization of the speed of travel of the cutters with the speed of travel of the material at the time of cut and which may involve a relatively great speed of the cutters in the direction of feed of the moving material, and that is relatively compact as to the cutting unit and not ungainly, provision for mis-cut and multiple changes in length serving to extend the range of intervals between the cutting actions.

In the accompanying drawings:—

Fig. 4 is a front elevation of the cutter unit on an enlarged scale.

Fig. 6 is a view similar to Fig. 4, with parts in section on the line 6—6 of Fig. 5.

Fig. 7A is a side view similar to Fig. 5 illustrating the synchronizing principle involved in the rocker-cutter unit.

Fig. 7B is a view similar to Fig. 7A, of a modified construction.

Fig. 7C is a view similar to Figs. 7A and 7B, of still another modified construction.

Figure 1:
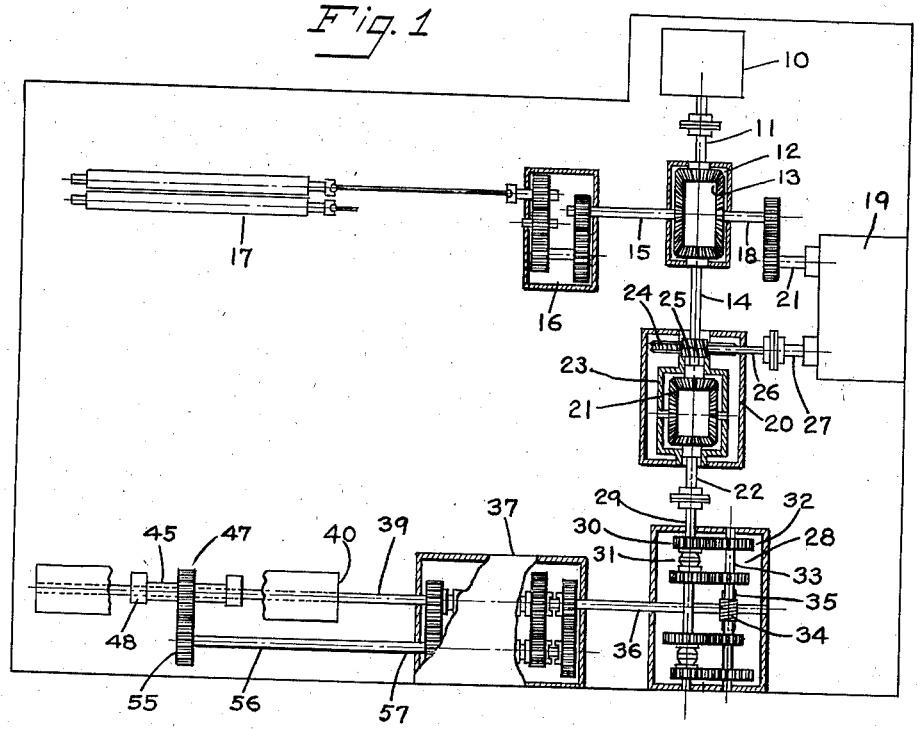
Figure 1 is a plan view illustrating one embodiment of my invention in the form of a rocker flying shear, being generally diagrammatic.

My improved rocker flying shear as a whole comprises means of unique form for extending the range for the lengths of cut in combination with means for providing for fine gradations of cut.

The present application involves specifically means applicable to a flying shear having feed means for feeding stock at a uniform rate through the machine for effecting synchronization of the cutting blades with the speed of feed of the stock for the various lengths of cut, and in combination therewith and cooperating therewith means of unique form for effecting mis-cut and thereby effecting a multiple change in the length of cut.

The shear is driven by means of a constant speed motor 10 that drives a shaft 11 that enters at one end of a drive unit 12 in which is housed a nest of bevel gears 13. Driven shafts emerging from said unit comprise a straight-away shaft 14 at the other end and laterally directed shafts at the two sides.

The shaft 15 at one side, operating through a gear structure 16, drives the feed unit 17 of ordinary form and comprising straightening or bending rolls and feed rolls of ordinary form.

The shaft 18 at the other side of the drive unit 12 and the straight-away shaft 14 cooperate in effecting the drive for cutting by operating in combination a variable speed device 19 and a differential gear device 20 that serve as a speed-adjustment group.

The side shaft 18 operating through any proper means drives a shaft 21 that enters the variable speed device 19.

The straight-away shaft 14 enters one end of the differential device 20 and through the medium of the set of bevel gears 21 forming part thereof has a part in effecting the adjustable drive for the shaft 22 that emerges from the other end of the differential. The differential housing 23 is provided with a worm gear 24 that is concentric with the shafts 14 and 22 and that is in mesh with a worm 25 on the shaft 26 that is coupled to the shaft 27 that emerges from the variable speed device 19.

The speed-adjustment group 19, 20 mentioned is adapted to operate over a definite pre-selected range for fine changes in lengths of cut and to provide for permitting adjustment for any length between the limits provided. Such range, however, is usually only a fraction of the full range desired. Therefore, supplemental to the fine adjustment means provided by the group mentioned, other means must be provided and this, in the present instance comprises a speed-change gear unit 28, consisting of mating pairs of gears adapted for selective use, including suitable couplings. The main shaft 29 of the unit 28 is in the form of an extension of shaft 22 and carries four gears 30 and the two couplings 31 and associated parts. The four driven gears 32 are on the driven shaft 33 and which shaft carries a worm 34.

The worm 34 operates a worm wheel 35 that is mounted on a shaft 36 that effects the modified drive for the cutting.

It is sufficient for the present application to state briefly that the changes provided for by the gear unit 28 are arranged in what may be described as successive steps, the one differing from the other by substantially equal intervals and such intervals equal the range of the fine-adjustment speed-adjustment group 19, 20, the one being tied-up with the other.

With shaft 36 begins the specific characterization of the present application. Said shaft enters the mis-cut gear unit 37.

Two shafts 39, 56 emerge from the mis-cut gear unit 37, respectively, one for each of the cutter blades. Disregarding couplings and extensions, the rear shaft 39, which actually is an extension of shaft 36, is designated as the main or main eccentric shaft, extends through the machine side wall 40, is supported by spaced bearings 41, comprises an intermediate portion 42 that is especially shaped or formed to perform two distinct functions, and comprises a protruding end portion 43 that is utilized to effect important results.

The middle part of the intermediate portion 42 of shaft 39, designated by the character 44, is concentric with the axis and carries a relatively elongated sleeve 45 that is rotatably mounted on shaft 39 and functions as a shaft for operatively supporting the lower knife sliding gate 46 and the means for driving the same in the form of a gear 47 at the middle. At the ends of the sleeve 45 are eccentrics 48 that operate the gate through the medium of the connecting-rods 49, the upper ends of the latter being pivotally connected to the gate by the pivot rod 50.

Extending around the gate 46 is a U-shaped shear frame 51 whose sides 52 are operatively supported by means of main eccentrics 53 that constitute the ends of the part designated as the intermediate portion 42 of the main shaft. The inner portion 54 of the sides 52 are provided with guide means to slidingly guide the gate 46.

By the means described, the gate is actuated independently of the main shaft. The drive means therefor is a gear 55 that meshes with the gear 47 and that is mounted on a shaft 56 that is an extension of the shaft 57, said shaft 57 being the front shaft of the two that emerge from the mis-cut gear unit 37.

The mis-cut gear unit 37 houses gears and clutches and shaft means therefor for use in making a few relatively simple and elementary gear changes for obtaining a multiple change effect for providing a corresponding change in the length of cut. Generally, means for effecting ratios of speed of rotation of the sleeve 45 to the shaft 39, of one to one, one and one-half to one, and one and one-third to one will suffice. As related to the shear frame eccentrics and the main shaft that supports these parts, the list of ratios mentioned provide respectively for effecting a cutting of the stock once for each revolution of the main shaft, once in two revolutions thereof, and once in three revolutions.

The protruding end portion 43 of the main shaft and associated parts provide the means for effecting synchronization of the cutting blades in their forward movement at the moment of severing the stock to correspond with the changes in length of cut.

The lower blade 58 is carried by the gate 46 and the upper blade 59 is carried by the yoke portion 60 of the shear frame 51.

A variety of ways of varying the speed of travel of the shear frame in the direction of travel of the material being cut to synchronize the speed of travel of the cutters or knives with the speed of travel of the material may be provided and a few of these are shown and will be described, all associated with means for varying the length of cut.

In one way, the sides 52 of the shear frame 51 are projected below the supporting or main eccentrics 53 and said extensions 61 are provided with guide means 62 for operatively guiding respectively sliding boxes 63 that are provided each with a bearing opening 64. Housed in said openings 64 are auxiliary or synchronizing eccentrics in the form of cranks 65 that are integral with the auxiliary or auxiliary eccentric shaft 66.

Means are thus provided for giving limited to and fro and upward and downward movement of the shear frame.

The means for effecting synchronization under various conditions involve the protruding shaft end 43 of the main shaft 39 and an adjacent projecting end portion 67 of the eccentric shaft 66. In each case the shaft end is concentric with the shaft axis. On the shaft 66 is mounted a gear 68, keyed to the shaft. On the main shaft 39 is a crank-disc 69, in the form of an adjustable drive by reason of a diametral slot 70 for adjustably receiving a crank-disc pin 71. Mechanism interconnecting the pin 71 and the gear or pinion 68 comprise a translating lever 72 (see Figs. 5 and 7A) off-set to one side and pivoted by its upper end 73. Adjacent the middle portion of the lever 72 is a generally horizontally directed drive arm 74 that is connected by the respective ends to the pin 71 and to the lever 72 by means of a stud 75.

Connected to the lower end of the lever 72 by a stud 76 is a rack arm 77 that, guided in any proper manner, engages by means of rack teeth 78 with the under side of the pinion 68.

As viewed from the left end of the main shaft 39, said shaft operates counter-clockwise under operating conditions. Without any movement of the shaft 66, the eccentric structure of the main shaft 39 suffices to provide both the upward and downward movement and the oscillating, to and fro, movement of the shear frame in an endless-loop path of general elliptical form needed for the complete cutting operation. Such a condition can be obtained by setting the crank-pin 71 of the crank-disc 69 at the neutral or axial position.

Setting said pin 71 away from the axial position on one side serves to effect an individual, auxiliary or synchronizing swinging movement to the shear frame. Such auxiliary movement may be utilized either to add to the main swinging movement provided by the eccentric structure of the main shaft 39 or to subtract therefrom, depending upon which side of the axis of the main shaft that the crank-disc pin 71 has been set.

The proper speed of the swinging movement of the shear frame during the cutting operation in a given case for effecting synchronization, is attained by off-setting the crank-disc pin 71 to the proper amount and in the proper direction from the axis.

Other arrangements for obtaining the synchronizing effect are shown respectively in Figs. 7B and 7C. In the form of construction shown in Fig. 7B, the lower end extension 79 of the shear frame 80 does not support a sliding box and the associated parts as in the construction shown in Fig. 7A, but in lieu thereof is provided with a single pivotal pin 81 for receiving one end of the driven arm 82.

The eccentric structure, the eccentric shaft, the pinion, and the rack are at the other end of the said driven arm 82. These are supported in any proper manner in off-set relation to the shear frame.

The mechanism comprises the eccentric shaft 83 supporting the eccentrics 84, the rack pinion 85 on the shaft 83, and the rack-arm 86 having the rack teeth 87 engaged with the upper side generally of the pinion 85. The drive-end 88 of the rack-arm 86 is connected directly to the crank-disc pin 89, the latter being adjustable along the slot 90 of the crank-disc 91.

The changes here involved do not change the general operative conditions.

In the form of construction shown in Fig. 7C, the shear frame 92, in lieu of an extension at the lower end is provided with an ear structure or integral lug 93 for pivotally receiving one end 94 of the driven arm 95. The other end of said arm 95 is associated with mechanism generally like the corresponding mechanism shown in Fig. 7B.

Thus there is the eccentric shaft 96, eccentrics 97, pinion 98, and rack teeth 99 on rack-arm 100. The drive end 101 of the rack-arm 100 is connected to the crank-disc pin 102 that is adjustable along the diametral slot 103 in the crank-disc 104.

The crank-disc 104 is mounted on the main shaft 105 and the latter is provided with main eccentrics 106 that operatively support the shear frame 92.

In the form of construction shown in Fig. 7C, the pivotal connection 107 for mechanism for obtaining the superimposed swinging movement for the shear frame 92 is spaced above the axis of the main shaft 105. Therefore, in order to have the same effect as in the constructions shown in Figs. 7A and 7B, the main shaft and associated parts must be rotated clockwise instead of counter-clockwise as is the case for these other two constructions.

As described, the shear frame is operatively supported generally by the main eccentrics and is driven by said main eccentrics to provide the main or basic movement, such movement being the resultant of vertical and horizontal components. In cooperation with said main eccentrics there is provided synchronizing means for giving direction to the frame. In said positioning means are incorporated actuating, auxiliary eccentric structures that are adapted to effect an individual, auxiliary swinging movement to the frame, provided with means for adjustment both as to quantity and direction relatively to the main or basic movement.

The vertical component is unchanged and is selected in accordance with details of the stock to be cut and the like.

The horizontal component is the one that is involved in the detail of synchronization.

Ordinarily, the motor 10 is driven at a speed to give the highest feasible rate of output of sheared lengths of stock or material, such for example as metal, and ordinarily, the motor 10 is given a constant speed of rotation, which results in the feed rolls 17 feeding the stock to be cut, at a fixed speed of travel, regardless of any variations of speed of the shearing mechanism resulting from adjustment changes in parts 19, 28 and 37.

Under all conditions of cutting operation, the cutting edges of the upper and lower knives travel in endless loop or closed paths of general elliptical form. The upper knife travels anti-clockwise in a loop and the lower knife travels clockwise in a loop, the two loops overlapping during the cutting portion of the paths of travel of the knives.

Assume the speed-change gear unit 28 to have such two of the gears 30 and 32 in mesh as will give the slowest speed of rotation to shaft 39, and assume the variable speed device 19 to be adjusted to a given adjustment to accomplish, with the gears 30 and 32, an exactly desired speed of rotation of shaft 39 to accomplish a desired length of cut, and assume such of the gears of the mis-cut gear unit 37 to have been placed in mesh as will drive the shaft 56 at the same speed as shaft 39. Since the gears 55 and 47 are of equal size, the eccentric sleeve 45 will also be rotated at the same speed as the eccentric shaft 39. Also temporarily assume the crank pin 71 to be at its axial or neutral position so that the eccentrics 65 on shaft 66 remain stationary and thus merely serve as stationary pivots for the shear frame 51, although permitting an up and down motion to be given to the shear frame by the eccentrics 53 on shaft 39. The rotation of the shaft 39 and sleeve 45 at the same speed will cause the shear frame 51 and sliding gate 46 to rock or oscillate through an angle such as $a$ (Fig. 7A) with the upper shear knife 59 traveling counter-clockwise in a loop, and the lower shear knife 58 traveling clockwise in a loop, a part of whose upper portion overlaps a part of the lower part of the loop path of the upper knife 59 to produce the cutting or shearing action.

Figure 2:
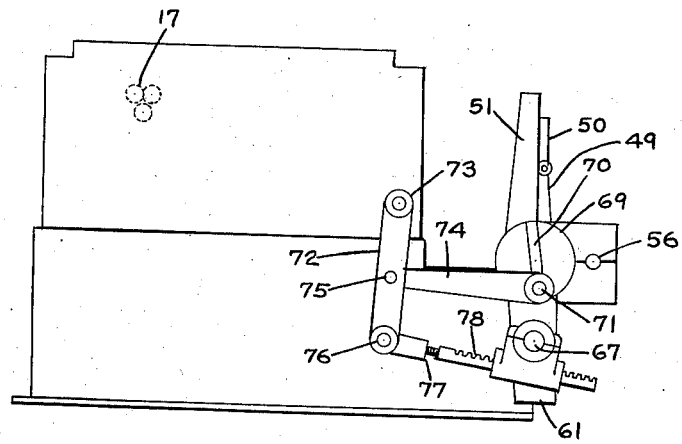
Fig. 2 is a side elevation, as viewed from the side of the feeding and cutting units.
Figure 3:
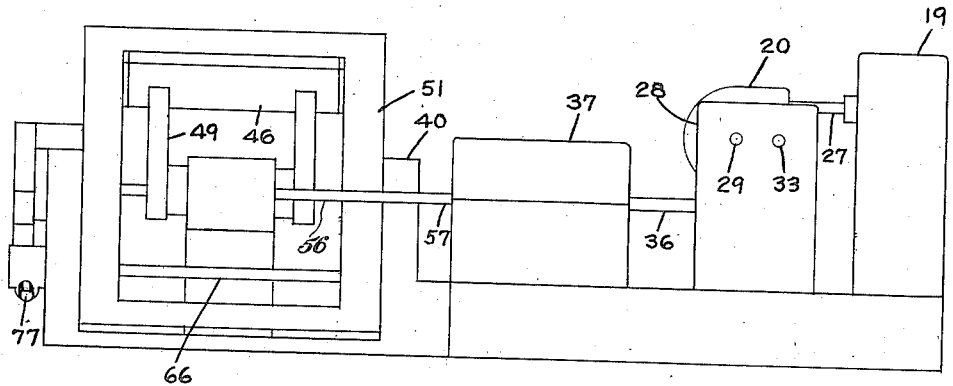
Fig. 3 is a front elevation.
Figure 5:
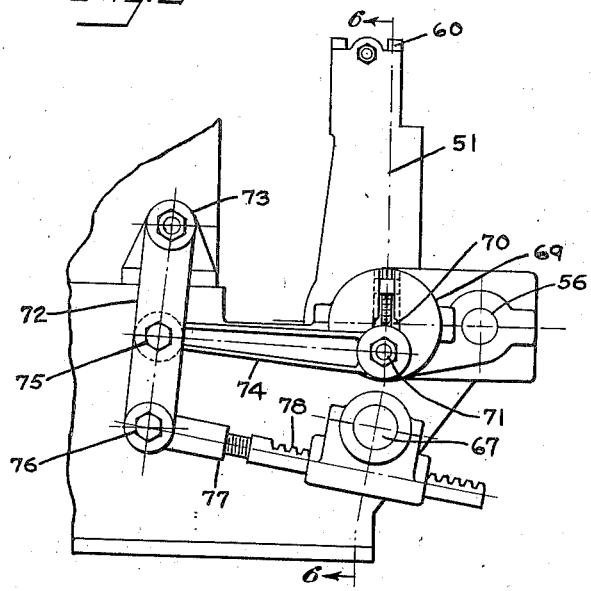
Fig. 5 is a side view of the cutter unit.

Therefore, as the stock to be cut, in sheet or other form, is fed by the feed rolls 17 toward the right of Fig. 2 to the shear knives, the shear knives will be moving in the direction of travel of the feed of the stock during the cutting portion of their travel. But if the knives at the time of cutting were to have a faster or slower horizontal component of travel than the speed of the horizontal travel of the stock, then, since the stock is substantially inelastic, damage would be done to the stock. Therefore it is important to synchronize the speeds of travel of the knives and stock to be cut. If in the present assumed instance, the cutting portion of travel of the knives is slower than the travel of the stock, then the pin 71 is adjusted down below the center to some position such as illustrated in Figs. 2, 5 and 7A. Referring to Fig. 7A, it will be seen that starting from the position shown, with the main shaft 39 rotating anti-clockwise, the shear frame eccentrics 53 will start the shear frame 51 and gate 46 swinging toward the right, while the pin 71, acting through parts 74, 72, 77 and 68, will at the same time cause the eccentrics 65 and the lower end of the shear frame to swing to the left, thus causing the upper portion of the shear frame to swing to the right through a larger angle such as $b$, due to the superimposed or additive action or motion of the two sets of eccentrics 53 and 65 respectively on the two shafts 39 and 66. When the eccentrics 53 reach that point in their rotation where their centers pass to the left through the vertical center plane of shaft 39, the centers of eccentrics 65 are passing to the right of said plane, thus producing an opposite motion but additive action which causes the upper part of the shear frame to swing to the left limit of its angle of motion, such as the angle $b$. Continued rotation of shaft 39 repeatedly swings the shear frame back and forth through an angle $b$ while the eccentrics 53 move the shear frame 51 up and down. Thus the shear frame now moves through a longer loop represented by angle $b$ in the same interval of time, than it moved through the shorter loop represented by angle $a$ when the pin 71 was at neutral or axial position, and therefore the upper shear knife 59 fixed to the shear frame 51 now travels faster than before, the adjustment of the pin 71 now being assumed to be such that the speed of travel of the horizontal component of the cutting portion of travel of the upper knife 59 is substantially the same as the speed of travel of the stock being cut.

As the gate 46 and its knife 58 are constantly held in sliding relation with the shear frame 51 and its knife 59, the gate 46 also swings through angle b. But since in the present assumed condition of operation, the eccentric sleeve 45 and its eccentrics 48, and main shaft 39 and its eccentrics 53 rotate at equal speeds, the vertical movement of the lower knife and gate is always opposite to that of the upper knife and shear frame. Thus it will be seen that the speed of the horizontal components of travel of both shear knives at the time of cutting, are substantially the same as, or synchronized with, the speed of feed of the stock being cut, and equal lengths of stock are cut or sheared off at each rotation of the shaft 39 and eccentric sleeve 45.

Now assume that it is desired to cut stock into shorter lengths than in the preceding assumed instance. The previously meshed gears 30, 32 of the speed-change gear unit are thrown out of mesh and two other of gears 30, 32 are thrown into mesh to drive the shaft 39 at a higher speed. And the variable speed device 19 is adjusted to get the exact higher speed of rotation of shaft 39 and of travel of the shear frame needed to get the exact shorter length of cut desired. No change is made in the adjustment of the mis-cut gear unit 37. Since the speed of feed of the stock to be cut is constant, the shear blades must make more cuts in a given interval of time in order to result in the stock being cut into shorter lengths. But the higher speed of the cutting or shearing operations means that the speed of travel, and therefore the speed of travel of the cutting portion of the knives, must be greater than in the instance previously completely described. Therefore, since the shear knives were correctly synchronized with the feed of the stock to be cut prior to this last described speed-up of the shear knives, the latter will now be traveling too fast at the time of shearing. Therefore, to slow down the speed of travel of the knives to a point where their speed is synchronized with the feed of the stock being cut, the crank pin 71 is adjusted up toward the center of the shaft 39 (Fig. 7A), or even to a point above the center if necessary, in order to make the shear frame oscillate through an angle less than angle b or if necessary even less than angle a, in order that the shear frame, by traveling through a smaller loop, will have the cutting portion of travel of the shear knives moving at a proper speed to synchronize with the speed of feed of the stock being cut.

For simplicity, now assume that it is desired to cut stock into lengths which are just exactly twice the length of those cut by the adjustments just previously described. To accomplish this, the mis-cut gear unit 37 is adjusted to cause the shaft 56 and eccentric sleeve 45 each to rotate one and one-half times as fast as the eccentric shaft 39. This results in the lower knife 58 meeting the upper knife 59 in cutting position, only once in each two revolutions of shaft 39, thus resulting in cutting the stock into lengths which are exactly double what they were when cutting took place at each revolution of shaft 39. Inasmuch as no adjustments except in the mis-cut gear unit have been made, the shear blades remain in synchronism with the feed of stock.

Now assume that the mis-cut gear unit 37 is adjusted to cause the shaft 56 and eccentric sleeve 45 to rotate one and one-third times as fast as the eccentric shaft 39. This results in the lower knife 58 meeting the upper knife 59 in cutting position, only once in each three revolutions of shaft 39, thus resulting in cutting the stock into lengths which are exactly three times what they were when cutting took place at each revolution of shaft 39. Inasmuch as no adjustments except in the mis-cut gear unit have been made, the shear knives remain in synchronism with the feed. If, however, in addition to utilizing the miscutting feature to accomplish longer cuts, it is also necessary to adjust one or both of the units 28 and 19 to get a given length of cut desired, these adjustments can be made for use along with the miscutting, and in such case, it will then be necessary to suitably adjust the crank pin 71 to overcome the change in horizontal component of speed of the knives during cutting travel which has resulted from adjustment from one or both of units 28, 19, in order to again synchronize the knives with the feed of stock, as previously more fully described. By having the sleeve 45 rotate at still another ratio compared to the eccentric shaft 39, the knives will meet in cutting position only once in still different number of revolutions, as will be obvious.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim as my invention:—

1. A flying cutting device comprising: a cutter-carrier provided with cutter-means; feed-means adapted to feed stock to said cutter-means, to be cut; eccentric driving-means for actuating said cutter-carrier to cause the latter to move said cutter-means in an endless-loop path, and cut said stock during a portion of said endless-loop path of movement while said stock is being fed; speed-changing means for changing the speed of said eccentric driving-means and consequently the speed of said endless-loop path of movement; and eccentric synchronizing means having a driving connection with said cutter-carrier and adapted to actuate said cutter carrier to modify said endless-loop path of movement, and including adjustable-means to adjust the degree of modification of said endless-loop path of movement to synchronize the speed of travel of said cutter-means with the speed of feed of the stock during the travel of said cutter-means along the cutting portion of said endless-loop path of movement.

2. A flying cutting device comprising: a cutter-carrier provided with cutter-means; feed-means adapted to feed stock to said cutter-means, to be cut; eccentric driving-means for actuating said cutter-carrier to cause the latter to move said cutter-means in an endless-loop path, and cut said stock during a portion of said endless-loop path of movement while said stock is being fed; a drive-shaft; speed-changing means for changing the speed of said eccentric driving-means and consequently the speed of said endless-loop path of movement; and eccentric synchronizing-means driven by said drive-shaft and having a driving connection with said cutter-carrier and adapted to actuate said cutter carrier to modify said endless-loop path of movement, and including adjustable-means in the connection between said synchronizing-means and said cutter-carrier and adjustable toward and from the axis of said drive-shaft on each of opposite sides of said axis to adjust the degree of modification of said endless-loop path of movement to synchronize the speed of travel of said cutter-means with the speed of feed of the stock during the travel of said cutter-means along the cutting portion of said endless-loop path of movement.

3. A flying cutting device comprising: a cutter-carrier provided with cutter-means; feed-means adapted to feed stock to said cutter-means, to be cut; eccentric driving-means for actuating said cutter-carrier to cause the latter to move said cutter-means in an endless-loop path, and cut said stock during a portion of said endless-loop path of movement while said stock is being fed; a drive-shaft; speed-changing means for changing the speed of said eccentric driving-means and consequently the speed of said endless-loop path of movement; and eccentric synchronizing-means driven by said drive-shaft and having connection with said cutter-carrier and adapted to modify said endless-loop path of movement, and including adjustable-means in the connection between said synchronizing-means and said cutter-carrier and adjustable toward and from the axis of said drive-shaft on each of opposite sides of said axis to adjust the degree of modification of said endless-loop path of movement to synchronize the speed of travel of said cutter-means with the speed of feed of the stock during the travel of said cutter-means along the cutting portion of said endless-loop path of movement.

4. A flying cutting device comprising: a cutter-carrier provided with cutter-means; feed-means adapted to feed stock to said cutter-means, to be cut; eccentric driving-means for actuating said cutter-carrier to cause the latter to move said cutter-means in an endless-loop path, and cut said stock during a portion of said endless-loop path of movement while said stock is being fed; speed-changing means for changing the speed of said eccentric driving-means and consequently the speed of said endless-loop path of movement; and eccentric synchronizing-means including rack-and-pinion means and having connection with said cutter-carrier and adapted to modify said endless-loop path of movement, and including adjustable-means to adjust the degree of modification of said endless-loop path of movement to synchronize the speed of travel of said cutter-means with the speed of feed of the stock during the travel of said cutter-means along the cutting portion of said endless-loop path of movement.

5. A flying cutting device comprising: a cutter-carrier provided with cutter-means; feed-means adapted to feed stock to said cutter-means, to be cut; eccentric driving-means for actuating said cutter-carrier to cause the latter to move said cutter-means in an endless-loop path, and cut said stock during a portion of said endless-loop path of movement while said stock is being fed; a drive-shaft; speed-changing means for changing the speed of said eccentric driving-means and consequently the speed of said endless-loop path of movement; and eccentric synchronizing-means including rack-and-pinion means driven by said drive-shaft and having connection with said cutter-carrier and adapted to modify said endless-loop path of movement, and including adjustable-means in the connection between said synchronizing-means and said cutter-carrier and adjustable toward and from the axis of said drive-shaft on each of opposite sides of said axis to adjust the degree of modification of said endless-loop path of movement to synchronize the speed of travel of said cutter-means with the speed of feed of the stock during the travel of said cutter-means along the cutting portion of said endless-loop path of movement.

6. A flying cutting device comprising: a rockable frame having a first cutter secured thereto; a sliding-gate having a second cutter secured thereto; said sliding-gate being rockable with and arranged in sliding relation to said rockable frame to relatively reciprocate said cutters into and out of cutting relation with one another; feed-means adapted to feed stock between said cutters, to be cut; a rotatable drive-shaft having eccentric frame-driving means secured thereto for rocking said rockable frame to cause the latter to move said first cutter in an endless-loop path; gate-driving means for sliding said sliding-gate and second cutter to cause said cutters to come into cutting relation and cut said stock during a portion of said endless-loop path of movement; speed-changing means for changing the speed of said frame-driving means and consequently the speed of said endless-loop path of movement; and eccentric synchronizing-means having a driving connection with said rockable frame and adapted to actuate said cutter carrier to modify said endless-loop path of movement, and including adjustable-means to adjust the degree of modification of said endless-loop path of movement to synchronize the speed of travel of said cutters with the speed of feed of the stock during the travel of said first cutter along the cutting portion of said endless-loop path of movement.

7. A flying cutting device comprising: a rockable frame having a first cutter secured thereto; a sliding-gate having a second cutter secured thereto; said sliding-gate being rockable with and arranged in sliding relation to said rockable frame to relatively reciprocate said cutters into and out of cutting relation with one another; feed-means adapted to feed stock between said cutters, to be cut; a rotatable drive-shaft having eccentric frame-driving means secured thereto for rocking said rockable frame to cause the latter to move said first cutter in an endless-loop path; eccentric gate-driving means rotatably mounted on said rotatable drive-shaft and adapted to be rotated independently of the rotation of said drive-shaft for sliding said sliding-gate and second cutter to cause said cutters to come into cutting relation and cut said stock during a portion of said endless-loop path of movement; speed-changing means for changing the speed of said frame-driving means and consequently the speed of said endless-loop path of movement; and eccentric synchronizing-means having connection with said rockable frame to modify said endless-loop path of movement, and including adjustable-means to adjust the degree of modification of said endless-loop path of movement to synchronize the speed of travel of said cutters with the speed of feed of the stock during the travel of said first cutter along the cutting portion of said endless-loop path of movement.

8. A flying cutting device comprising: a rockable frame having a first cutter secured thereto; a sliding-gate having a second cutter secured thereto; said sliding-gate being rockable with and arranged in sliding relation to said rockable frame to relatively reciprocate said cutters into and out of cutting relation with one another; feed-means adapted to feed stock between said cutters, to be cut; a rotatable drive-shaft having eccentric frame-driving means secured thereto for rocking said rockable frame to cause the latter to move said first cutter in an endless-loop path; eccentric gate-driving means rotatably mounted on said rotatable drive-shaft and adapted to be rotated at a different speed from the speed of rotation of said drive-shaft for sliding said sliding-gate and second cutter to cause said cutters to come into cutting relation and cut said stock during a portion of said endless-loop path of movement once in each plural number of revolutions of said drive-shaft; speed-changing means for changing the speed of said frame-driving means and consequently the speed of said endless-loop path of movement; and eccentric synchronizing-means having connection with said rockable frame to modify said endless-loop path of movement, and including adjustable-means to adjust the degree of modification of said endless-loop path of movement to synchronize the speed of travel of said cutters with the speed of feed of the stock during the travel of said first cutter along the cutting portion of said endless-loop path of movement.

9. A flying cutting device comprising: a rockable frame having a first cutter secured thereto; a sliding-gate having a second cutter secured thereto; said sliding-gate being rockable with and arranged in sliding relation to said rockable frame to relatively reciprocate said cutters into and out of cutting relation with one another; feed-means adapted to feed stock between said cutters, to be cut; a rotatable drive-shaft having eccentric frame-driving means secured thereto for rocking said rockable frame to cause the latter to move said first cutter in an endless-loop path; gate-driving means rotatably mounted on said rotatable drive-shaft and adapted to be rotated at a higher speed than the speed of rotation of said drive-shaft for sliding said sliding-gate and second cutter to cause said cutters to come into cutting relation and cut said stock during a portion of said endless-loop path of movement once in each plural number of revolutions of said drive-shaft; speed-changing means for changing the speed of said frame-driving means and consequently the speed of said endless-loop path of movement; and eccentric synchronizing-means having connection with said rockable frame to modify said endless-loop path of movement, and including adjustable-means to adjust the degree of modification of said endless-loop path of movement to synchronize the speed of travel of said cutters with the speed of feed of the stock during the travel of said first cutter along the cutting portion of said endless-loop path of movement.

10. A flying cutting device comprising: a rockable frame having a first cutter secured thereto; a sliding-gate having a second cutter secured thereto; said sliding-gate being rockable with and arranged in sliding relation to said rockable frame to relatively reciprocate said cutters into and out of cutting relation with one another; feed-means adapted to feed stock between said cutters, to be cut; a rotatable drive-shaft having eccentric frame-driving means secured thereto for rocking said rockable frame to cause the latter to move said first cutter in an endless-loop path; gate-driving means for sliding said sliding-gate and second cutter to cause said cutters to come into cutting relation and cut said stock during a portion of said endless-loop path of movement; speed-changing means for changing the speed of said frame-driving means and consequently the speed of said endless-loop path of movement; eccentric synchronizing-means having connection with said rockable frame to modify said endless-loop path of movement, and including adjustable-means to adjust the degree of modification of said endless-loop path of movement to synchronize the speed of travel of said cutters with the speed of feed of the stock during the travel of said first cutter along the cutting portion of said endless-loop path of movement; and speed-changing means for changing the speed of said gate-driving means.

11. A flying cutting device comprising: a first cutter-carrier having a first cutter secured thereto, a second cutter-carrier having a second cutter secured thereto; said carriers being operable to cause said cutters to move toward and from one another, into and out of cutting relation with one another; feed-means adapted to feed stock between said cutters, to be cut; first-carrier drive-means for actuating said first-carrier to cause said first-cutter to move in a cycle having back-and-forth components of movement extending longitudinally of the plane of travel of the stock being cut, and other components of movement extending transversely toward and from the stock being cut; second-carrier drive-means for actuating said second-carrier to cause said second-cutter to move in a cycle having back-and-forth components of movement extending longitudinally of the plane of travel of the stock being cut, and other components of movement extending transversely toward and from said first-cutter and the stock being cut; and speed-changing means to cause said second-cutter to travel a greater number of cycles of movement than the number of cycles said first-cutter travels in a given length of time.

12. A flying cutting device comprising: a first cutter-carrier having a first-cutter secured thereto; a second cutter-carrier having a second-cutter secured thereto; said carriers being operable to cause said cutters to move toward and from one another, into and out of cutting relation with one another; feed-means adapted to feed stock between said cutters, to be cut; first-carrier drive-means including a rotatable drive-shaft for actuating said first-carrier to cause said first-cutter to move in a cycle having back-and-forth components of movement extending longitudinally of the plane of travel of the stock being cut, and other components of movement extending transversely toward and from the stock being cut; second-carrier drive-means including drive-means rotatably mounted on said drive-shaft for actuating said second-carrier to cause said second-cutter to move in a cycle having back-and-forth components of movement extending longitudinally of the plane of travel of the stock being cut, and other components of movement extending transversely toward and from said first-cutter and the stock being cut; and speed-changing means to change the speed of rotation of said drive-means which is rotatably mounted on said drive-shaft.

13. A flying cutting device comprising: a rockable frame having a first cutter secured thereto; a sliding-gate having a second cutter secured thereto; said sliding-gate being rockable with and arranged in sliding relation to said rockable frame to relatively reciprocate said cutters into and out of cutting relation with one another; feed-means adapted to feed stock between said cutters, to be cut; a rotatable-frame drive-shaft for rocking said rockable frame to cause the latter to move said first cutter in an endless-loop path; and gate-drive means rotatably mounted on said frame-drive shaft and adapted to be rotated independently of the rotation of said frame-drive shaft to reciprocate said sliding-gate and second cutter to cause said cutters to come into cutting relation; and speed-changing means to change the speed of rotation of said gate-drive means.

14. A flying cutting device comprising: a rockable frame having a first cutter secured thereto; a sliding-gate having a second cutter secured thereto; said sliding-gate being rockable with and arranged in sliding relation to said rockable frame to relatively reciprocate said cutters into and out of cutting relation with one another; feed-means adapted to feed stock between said cutters, to be cut; a rotatable-frame drive-shaft having eccentric-frame driving-means secured thereto for rocking said rockable frame to cause the latter to move said first cutter in an endless-loop path; and gate-drive eccentric-sleeve means rotatably mounted on said frame-drive shaft and adapted to be rotated independently of the rotation of said frame-drive shaft to reciprocate said sliding-gate and second cutter to cause said cutters to come into cutting relation; and speed-changing means to change the speed of rotation of said gate-drive eccentric-sleeve means.

15. A flying cutting device comprising: a rockable frame having a first cutter secured thereto; a sliding-gate having a second cutter secured thereto; said sliding-gate being rockable with and arranged in sliding relation to said rockable frame to relatively reciprocate said cutters into and out of cutting relation with one another; feed-means adapted to feed stock between said cutters, to be cut; a rotatable-frame drive-shaft having spaced-apart driving-eccentrics secured thereto for rocking said rockable frame to cause the latter to move said first cutter in an endless-loop path; and gate-drive eccentric-sleeve means rotatably mounted on said frame-drive shaft between said driving-eccentrics and adapted to be rotated independently of the rotation of said frame-drive shaft to reciprocate said sliding-gate and second cutter to cause said cutters to come into cutting relation; and speed-changing means to change the speed of rotation of said gate-drive eccentric-sleeve means.

16. A flying cutting device comprising: a rockable frame carrying cuter means; driving-means for rocking said rockable frame; and synchronizing means having a driving connection with said rockable frame and adapted to actuate said rockable frame to modify the rocking action produced by said driving-means; said synchronizing-means being relatively adjustable to said driving-means to give either an additive or increased speed of rocking at the time of cut or to give a subtractive or decreased speed of rocking at the time of cut, as compared with the speed of rocking produced by the said driving-means alone.

KARL WILLIAM HALLDEN.